United States Patent
Ramachandran

(10) Patent No.: US 7,409,463 B2
(45) Date of Patent: Aug. 5, 2008

(54) ON-DEMAND ACTIVE ROLE-BASED SOFTWARE PROVISIONING

(75) Inventor: Puthukode G. Ramachandran, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 998 days.

(21) Appl. No.: 10/728,162

(22) Filed: Dec. 4, 2003

(65) Prior Publication Data

US 2005/0125509 A1 Jun. 9, 2005

(51) Int. Cl.
*G06F 15/16* (2006.01)
*G06F 15/00* (2006.01)

(52) U.S. Cl. .................. 709/246; 709/206; 709/220; 707/4

(58) Field of Classification Search .............. 709/220, 709/224, 227, 246, 203, 206; 713/150; 370/401; 707/4

See application file for complete search history.

(56) References Cited

U.S. PATENT DOCUMENTS

| | | | |
|---|---|---|---|
| 6,418,554 B1 | 7/2002 | Delo et al. | 717/174 |
| 6,594,700 B1 * | 7/2003 | Graham et al. | 709/230 |
| 6,957,186 B1 * | 10/2005 | Guheen et al. | 705/1 |
| 7,103,681 B2 * | 9/2006 | Coulombe | 709/246 |
| 2002/0129356 A1 | 9/2002 | Hellerstein et al. | 717/177 |
| 2002/0147801 A1 | 10/2002 | Gullota et al. | 709/223 |
| 2002/0156904 A1 | 10/2002 | Gullota et al. | 709/229 |
| 2002/0194584 A1 | 12/2002 | Suorsa et al. | 717/176 |
| 2003/0018964 A1 | 1/2003 | Fox et al. | 717/177 |
| 2003/0037044 A1 | 2/2003 | Boreham et al. | 707/3 |
| 2003/0115196 A1 | 6/2003 | Boreham et al. | 707/4 |
| 2003/0126137 A1 | 7/2003 | McFadden et al. | 707/100 |
| 2003/0145317 A1 | 7/2003 | Chamberlain | 717/177 |
| 2003/0196080 A1 * | 10/2003 | Karman | 713/150 |
| 2005/0207432 A1 * | 9/2005 | Velez-Rivera et al. | 370/401 |

OTHER PUBLICATIONS

Gonzalez, Marti, *Software Package Installation Control*, RD n448, 08-2201, Article 1, p. 1435.
"Introducing IBM Tivoli Configuration Manager, Version 4.2", IBM Corp., 44 pgs.
"Tivoli Resource Center: Tivoli License Manager White Paper", IBM Corp., downloaded from http://www-3.ibm.com/software/tivoli/resource-center/ on Nov. 3, 2003, 1 pg.

(Continued)

*Primary Examiner*—Khanh Dinh
(74) *Attorney, Agent, or Firm*—Robert H. Frantz; Libby Z. Handelsman

(57) ABSTRACT

Automated software provisioning based upon a set of role definitions for a user of a configurable device such as a computer or personal digital assistant. The present invention may be realized as an enhancement or extension to currently available software distribution tools which are used to distribute software to remote and local machines, and to permit unattended software installation and maintenance. The invention provides role-based software provisioning which automatically distributes the appropriate software programs and updates to computers that are owned by users based on the role of each user, thereby avoiding the need for intensive manual efforts to determine which computers need what software. The invention may also be interfaced to a License Management system in order to accomplish automatic recovery of unused software licenses, and to obtain permission for installing new licenses, based on user role changes.

1 Claim, 8 Drawing Sheets

OTHER PUBLICATIONS

"Lightweight Directory Access Protocol V3", Internet Engineering Task Force, downloaded from http://www.ietf.org on Nov. 3, 2003, 51 pgs.

"JNDI Event Listeners", Sun Microsystems, downloaded from http://www.java.sun.com/products/jndi/tutorial on Nov. 3, 2003, 4 pgs.

"JNDI Event Notification", Sun Microsystems, downloaded from http://www.java.sun.com/products/jndi/tutorial on Nov. 3, 2003, 2 pgs.

"JNDI LDAP Unsolicited Notifications", Sun Microsystems, downloaded from http://www.java.sun.com/products/jndi/tutorial on Nov. 3, 2003, 2 pgs.

"JNDI Naming Events", Sun Microsystems, downloaded from http://www.java.sun.com/products/jndi/tutorial on Nov. 3, 2003, 4 pgs.

"What Is: JNDI", downloaded from http://techtarget.com on Nov. 3, 2003, 3 pgs.

"What Is: LDAP", downloaded from http://techtarget.com on Nov. 3, 2003, 3 pgs.

"What Is: Active Directory", downloaded from http://techtarget.com on Nov. 3, 2003, 3 pgs.

"What Is: Novell Directory Services", downloaded from http://techtarget.com on Nov. 3, 2003, 2 pgs.

"What Is: X.500 Directory Services", downloaded from http://techtarget.com on Nov. 3, 2003, 3 pgs.

* cited by examiner

*Prior Art*

*Prior Art*

ON-DEMAND ACTIVE ROLE-BASED SOFTWARE PROVISIONING

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

U.S. patent application Ser. No. 09/864,392, filed on May 24, 2001, by P. D. Griffin, et al., which is commonly assigned, is incorporated by reference, in its entirety including figures, to the present patent application

BACKGROUND OF THE INVENTION

1. Field of the Invention

The present invention related to an improved data processing system and, in particular, to a method and system for provisioning and de-provisioning software and resources assigned to a computing system based upon the organizational role of the user of the computing system.

2. Background of the Invention

Modern enterprise computing environments include a variety of networked computing devices such as servers, gateways, desktop clients, and pervasive devices including personal digital assistants ("PDA") and pocket PC's. Within a company's or organization's computing resources, there may be literally thousands of these devices at any given time, usually with one user assigned to each device.

So, for example, a particular member of an organization or company employee may have a desktop computer or PC assigned to him or her, usually located on his or her desk in his or her office. Additionally, this member or employee may also be assigned a PDA, as well as a laptop computer for use in telecommuting or during business trips.

Each of these devices will have a variety of hardware and software resources installed on it, some of which may be a part of a "standard" or "company wide" configuration, and other parts of which may be dependent on the member's or employee's function in the company or organization. For example, a company may adopt Linux as their company-wide operating system, so both the laptop and desktop PC's may be configured with a version of the Linux operating system along with some utility programs to allow them to access the company's wired or wireless networks. Additionally, the employee may have a job description which will require him or her to draft documents, and prepare budgets, so both the laptop and the desktop computers may be configured with IBM's Lotus WordPro™ word processor application program, as well as Lotus 1-2-3 ™ spreadsheet application. Further, assume that this employee or member is involved in sales, so a contact management application program may be provided on the desktop and laptop computers, as well. The PDA may also be configured with "filters" or "readers" for the word processor, spreadsheet, and contact management file types, as well.

Now consider a second employee or member of the same organization who has a different job description, such as a technical support engineer. This person's computers would receive the company-wide options, such as the Linux operating system and networking components, but would not necessarily need the contact management application or the spreadsheet program. Instead, this second employee would need a Java ™ programming suite, such as IBM's Visual Age ™ suite, and a client program to remotely access a trouble ticket database.

In some organizations and company's, there is a manual process for configuring and maintaining these types of computers. As a new employee or member is added to the group, a person within the Information Technology ("IT") group is responsible to select the appropriate computer platforms, to select the appropriate application programs, and to install each program manually. Then, as the user's job function changes (e.g. he or she moves to a different department, is promoted, etc.), someone within the IT group must manually change the software configuration of the user's computers (e.g. laptop, desktop, PDA, etc.). Additionally, each time an application program is upgraded, the IT group must manually apply the upgrades to the user's computer(s), as well as re-install all of the application programs each time a computer is replaced or repaired. Even worse, most of these installation and upgrade actions require the IT professional to be physically colocated with the computer being modified, which may require substantial travel to support a geographically distributed work force.

This manual process can be onerous even to a small group or company, and can be paralyzing to medium and large size enterprises. The record keeping requirements can be substantial in order to manage licenses (e.g. manage a company's investment in software products), proliferate new application program installations, provide upgrades, and "swap out" computers for newer or more powerful systems.

To answer this problem, several companies have developed enterprise configuration management ("CM") tools which allow an IT department to manage the software configurations of a wide variety of networked computers from a centralized and remote location. One such CM tool is IBM's Tivoli Configuration Manager. Other tools with similar objectives are provided by Computer Associates and BMC Software.

Then IBM Tivoli Configuration Manager can help a company or organization gain total control over their enterprise software and hardware using its software distribution module which allows an IT department to rapidly and efficiently deploy complex mission-critical applications to multiple locations from a central point. Following initial deployment of systems, the Tivoli CM inventory module automatically scans for and collects hardware and software configuration information from computer systems across the managed enterprise. The software deployment lifecycle has many steps, and Tivoli CM allows IT departments to manage the systems from packaging, planning and administration to delivery, installation and reporting.

Tivoli CM provides a function known as "multicasting", which can significantly reduce network bandwidth usage, and which can help in an environment where there are slow speed links between locations (e.g. reaching wirelessly networked devices or systems located through a slow bridge). Using multicasting, software distribution time is independent of the number of targets, as each software package is only sent across the network once.

Tivoli CM also supports pervasive computing devices with integrated support for Palm Computing's PalmOS™, PocketPC's, and Nokia Communicator devices. This allows an IT department to update the configuration information and software on these devices using the same tools with which desktop and server systems are managed. By gaining control over the growing number of pervasive devices being deployed for business applications across the corporate enterprise; IT administrators do not need to learn to use a separate, specialized tool for managing these pervasive computing devices.

Tivoli CM also includes Enterprise Directory Support, which allows IT administrators to leverage organizational information stored in enterprise directories in order to determine a set of targets for a software distribution or an inventory scan. This allows software distribution and inventory operations to be targeted by specific users, and administrators can store information about users in a single location.

Additionally, Tivoli CM provides secure management of systems outside a corporate firewall through supporting secure software distribution and inventory operations through firewalls. Environments that have multiple levels of firewalls are also supported, which reduces security exposures inherent in managing in an extended enterprise environment, and allows a IT department to extend their management systems to support a company's or organization's customers and business partners, as well.

All of these management functions are conveniently provided through Administrative Consoles which run under a popular operating system such as Microsoft Corporation's Windows operating systems. By providing a single administrative console for both software distribution and inventory operations, and requiring only a single log-on for access to all IBM Tivoli Configuration Manager administrative tools, improved operational efficiency and ease of use for administrators are realized.

However, there still remains a primarily manual task of determining which software application programs and modules should be provisioned onto which computing systems based upon the intended user or "owner" of each system. While these types of configuration management systems greatly simplify the distribution, updating, uninstalling, and inventorying of a list or set of application programs for each computing system within the managed enterprise, they do little to help the IT administrator identify the proper application programs which should or should not be provisioned onto a particular computer or device.

SUMMARY OF THE INVENTION

The present invention automates the task of software provisioning using directory services such as Lightweight Directory Access Protocol ("LDAP") directories and Software distribution tools such as IBM Tivoli Configuration Manager using role-based criteria for user associated with each system to be provisioned and managed. Role-based software provisioning simplifies IT management and offers an automated solution to deploy software based on user roles.

The present invention may be realized as an enhancement or extension to currently available software distribution tools from various system management companies such as Tivoli and Computer Associates. These software distribution tools are used to distribute software to remote and local machines, and to permit unattended software installation and maintenance. These system management tool providers, however, view the managed computer resources purely from the management perspective, thereby leaving the task of determining which specific software programs are to be configured on each user's computer up to human IT administrator.

Our new role-based software provisioning automatically distributes the appropriate software programs and updates to computers that are owned by users based on the role of each user in the directory, thereby avoiding the need for intensive manual efforts to determine which computers need what software.

BRIEF DESCRIPTION OF THE DRAWINGS

The following detailed description when taken in conjunction with the figures presented herein provide a complete disclosure of the invention.

DESCRIPTION OF THE INVENTION

The present invention is preferably realized in conjunction with a software configuration management tool such as IBM's Tivoli Configuration Management system, or a similar tool such as those offered by Microsoft Corporation or Computer Associates. Alternatively, or in addition, the present invention may be realized in conjunction with a role-based security and access system, such as the one described in the related and incorporated patent application, or in conjunction with a role-based identity management system.

Suitable Computing Platforms

It will be readily recognized by those skilled in the art that the present invention may be realized as a software or firmware product being executed by one or more suitable computing platforms. Therefore, we first turn our attention to characteristics of suitable computing platforms for the present invention.

Figure 1A:
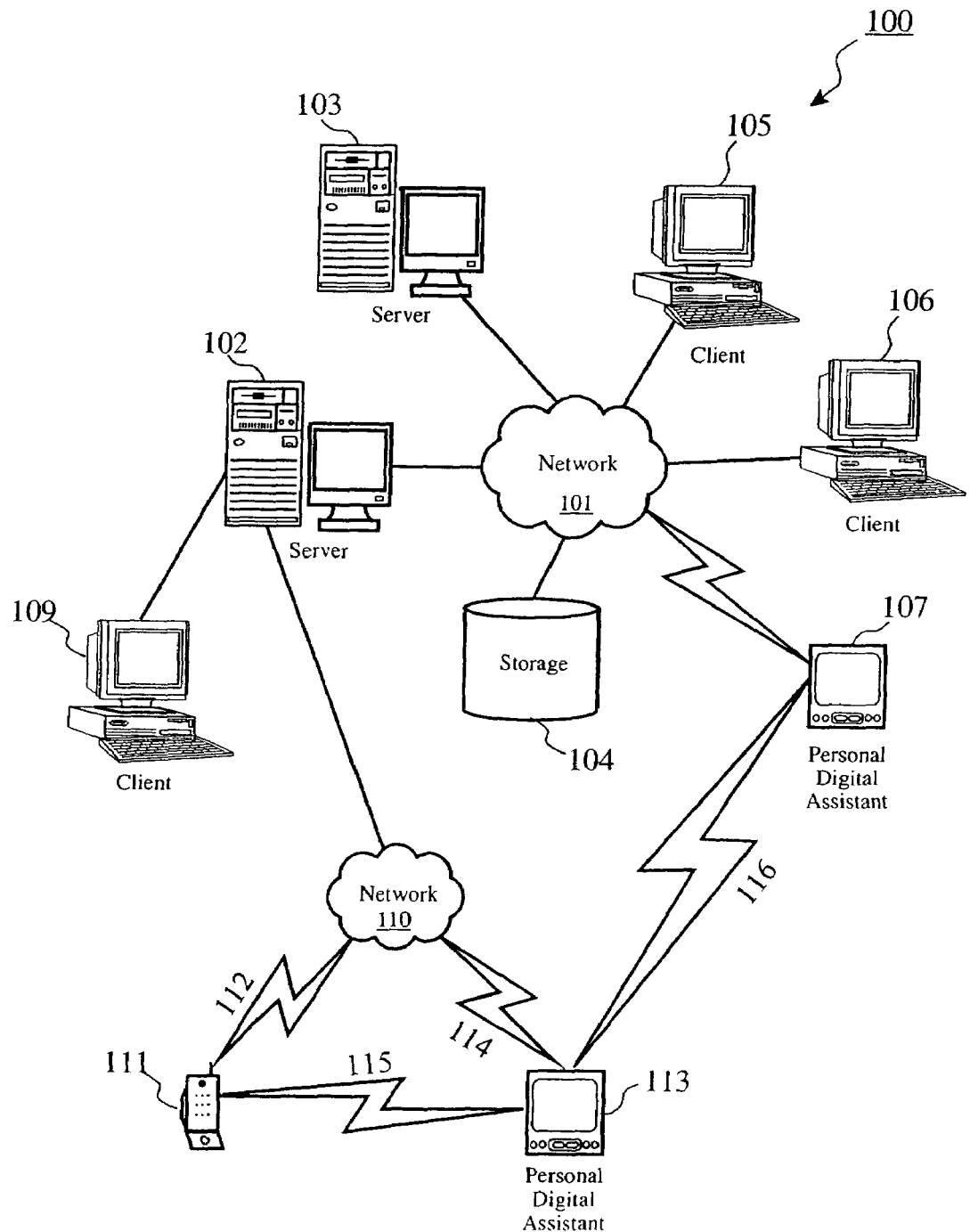
FIG. 1a depicts a typical distributed data processing system in which the present invention may be implemented.

With reference now to the figures, FIG. 1a depicts a typical network of data processing systems, each of which may implement the present invention or a portion of the present invention. A distributed data processing system (100) includes a computer network (101), which is a communication medium that may be used to provide communications links between various devices and computers connected together within the distributed data processing system (100). A computer network (101) may include permanent connections, such as wire or fiber optic cables, or temporary connections made through telephone or wireless communications. In the depicted example, two server systems (102, 103) are connected to the computer network (101) along with a storage unit (104). In addition, one or more client systems (105-107) also are connected to the network (101). The clients (105-107) and the servers (102-103) may be represented by a variety of computing devices, such as mainframes, personal computers, personal digital assistants ("PDAs"), etc. The distributed data processing system (100) may include additional servers, clients, routers, other devices, and peer-to-peer architectures that are not shown.

In the depicted example, the distributed data processing system (100) may also include the Internet with computer network (101) representing a worldwide collection of networks and gateways that use various protocols to communicate with one another, such as Lightweight Directory Access Protocol ("LDAP"), Transport Control Protocol/Internet Protocol ("TCP/IP"), Hypertext Transport Protocol ("HTTP"), Wireless Application Protocol ("WAP"), etc. Of course, the distributed data processing system (100) may also include a number of different types of networks, such as, for example, an intranet, a local area network ("LAN"), and/or a wide area network ("WAN"). For example, a server (102) may directly support a client (109) and network (110), which incorporates wireless communication links. A network-enabled phone (111) connects to the network (110) through a wireless link (112), and a personal digital assistance ("PDA") (113) connects to the network (110) through a wireless link (114), too. The telephone (111) and the PDA (113) can also directly transfer data between themselves across a wireless link (15) using an appropriate technology, such as Bluetooth ™ wireless technology or an InfraRed Data Arrangement ("IrDA"), to create so-called personal area networks or personal ad hoc networks. In a similar manner, a PDA (113) can transfer data to another PDA (117) via a wireless communication link (116).

The present invention could be implemented on a variety of hardware platforms; FIG. 1a is intended as an example of a heterogeneous computing environment and not as an architectural limitation for the present invention.

Figure 1B:
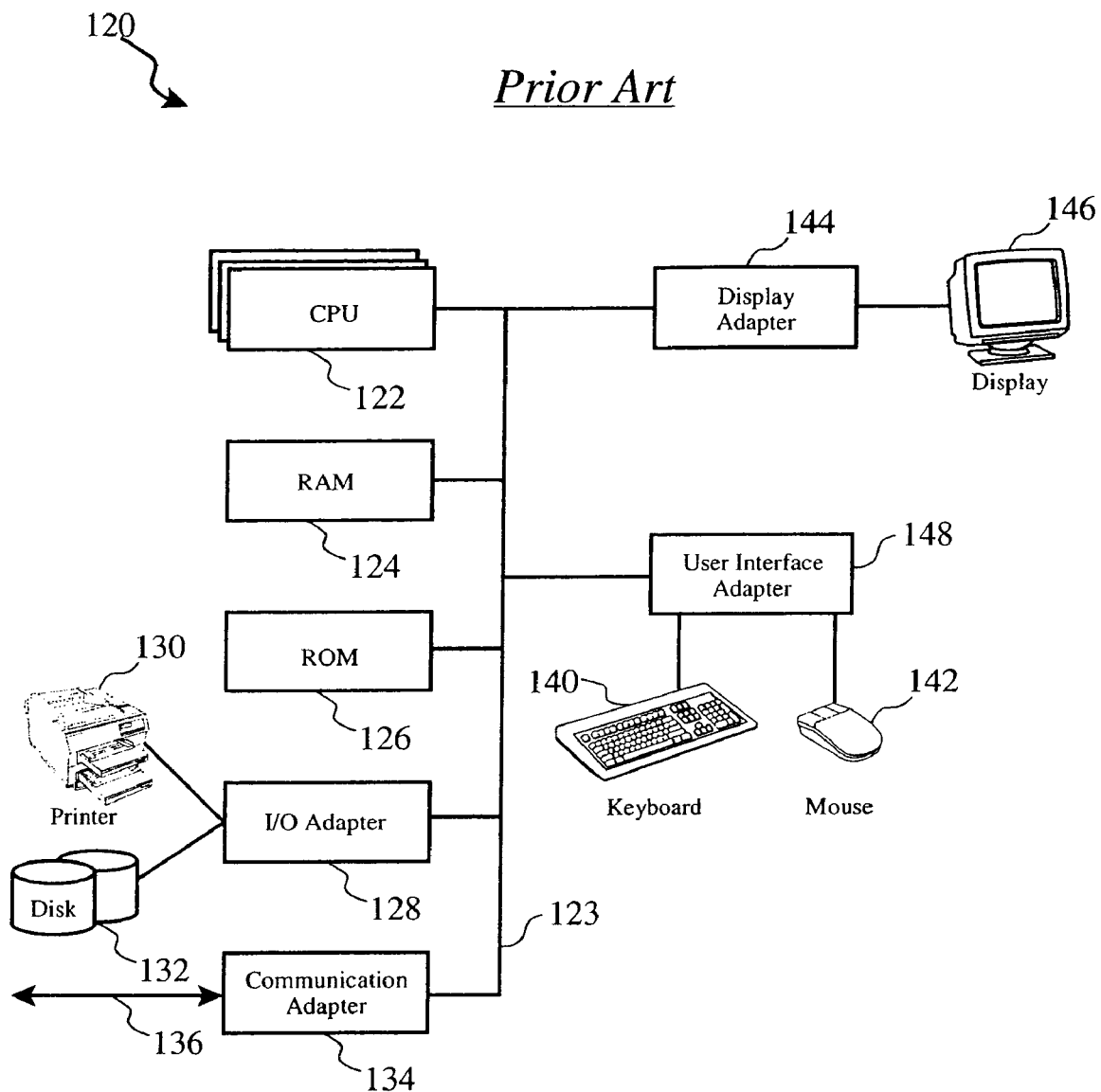
FIG. 1b depicts a typical computer architecture that may be used within a data processing system in which the present invention may be implemented.

FIG. 1b depicts a typical computer architecture of a data processing system, such as those shown in FIG. 1a, in which the present invention may be implemented. A data processing system (120) contains one or more central processing units ("CPUs") (122) connected to an internal system bus (123), which interconnects random access memory ("RAM") (124), read-only memory (126), and input/output adapter (128), which supports various I/O devices such as a printer (130), one or more disk units (132), or other devices not shown, such as a sound system, etc. The system bus (123) also connects a communication adapter (134) that provides access to communication link (136). A user interface adapter (148) connects various user devices, such as a keyboard (140) and a mouse (142), or other devices not shown, such as a touch screen, stylus, microphone, etc. A display adapter (144) connects the system bus (123) to a display device (146), such as a cathode ray tube ("CRT"), liquid crystal display ("LCD") or plasma display Those of ordinary skill in the art will appreciate that the hardware in FIG. 1b may vary depending on the system implementation. For example, the system may have one or more processors and one or more types of non-volatile memory. Other peripheral devices may be used in addition to or in place of the hardware depicted in FIG. 1b. In other words, one of ordinary skill in the art would not expect to find exactly the same components or architectures within a network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a UNIX™ operating system, while another device contains a simple JAVA ™ runtime environment. A representative computer platform may include a browser, which is a well-known software application for accessing hypertext documents in a variety of formats, such as graphic files, word processing files, eXtensible Markup Language ("XML"), Hypertext Markup Language ("HTML"), Handheld Device Markup Language ("HDML"), Wireless Markup Language ("WML"), and various other formats and types of files. Hence, it should be noted that the distributed data processing system shown in FIG. 1b is contemplated as being fully able to support a variety of peer-to-peer subnets and peer-to-peer services.

While the present invention will be described with reference to preferred embodiments in which object-oriented applications are utilized, the invention is not limited to the use of an object-oriented programming language. Rather, most programming languages could be utilized in an implementation of the present invention. In the preferred embodiment, though, Java Naming and Directory Interface ("JNDI") application programming interfaces ("APIs") are used to provide naming and directory functionality to system management functionality written using the Java programming language. The JNDI architecture consists of an API and a service provider interface ("SPI"). Java applications use the JNDI API to access a variety of naming and directory services, while the SPI enables a variety of naming and directory services to be plugged in transparently, thereby allowing a Java application using the JNDI API to access those services, which may include LDAP, Common Object Request Broker Architecture ("CORBA"), Common Object Services ("COS") name service, and Java Remote Method Invocation ("RMI") Registry. In other words, JNDI allows the system administration functionality of the present invention to be independent of any specific directory service implementation so that a variety of directories can be accessed in a common way.

It should also be noted that the present invention may be implemented, in part or in whole, using a distinction of client functionality versus server functionality. In other words, the data representations of objects may be manipulated either by a client or by a server, but the client and server functionality may be implemented as client and server processes on the same physical device. Thus, with regard to the descriptions of the preferred embodiments herein, client and server may constitute separate remote devices or the same device operating in two separate capacities. The data and application code of the present invention may be stored in local or distributed memory.

Role-based Software Provisioning Architecture

Figure 2:
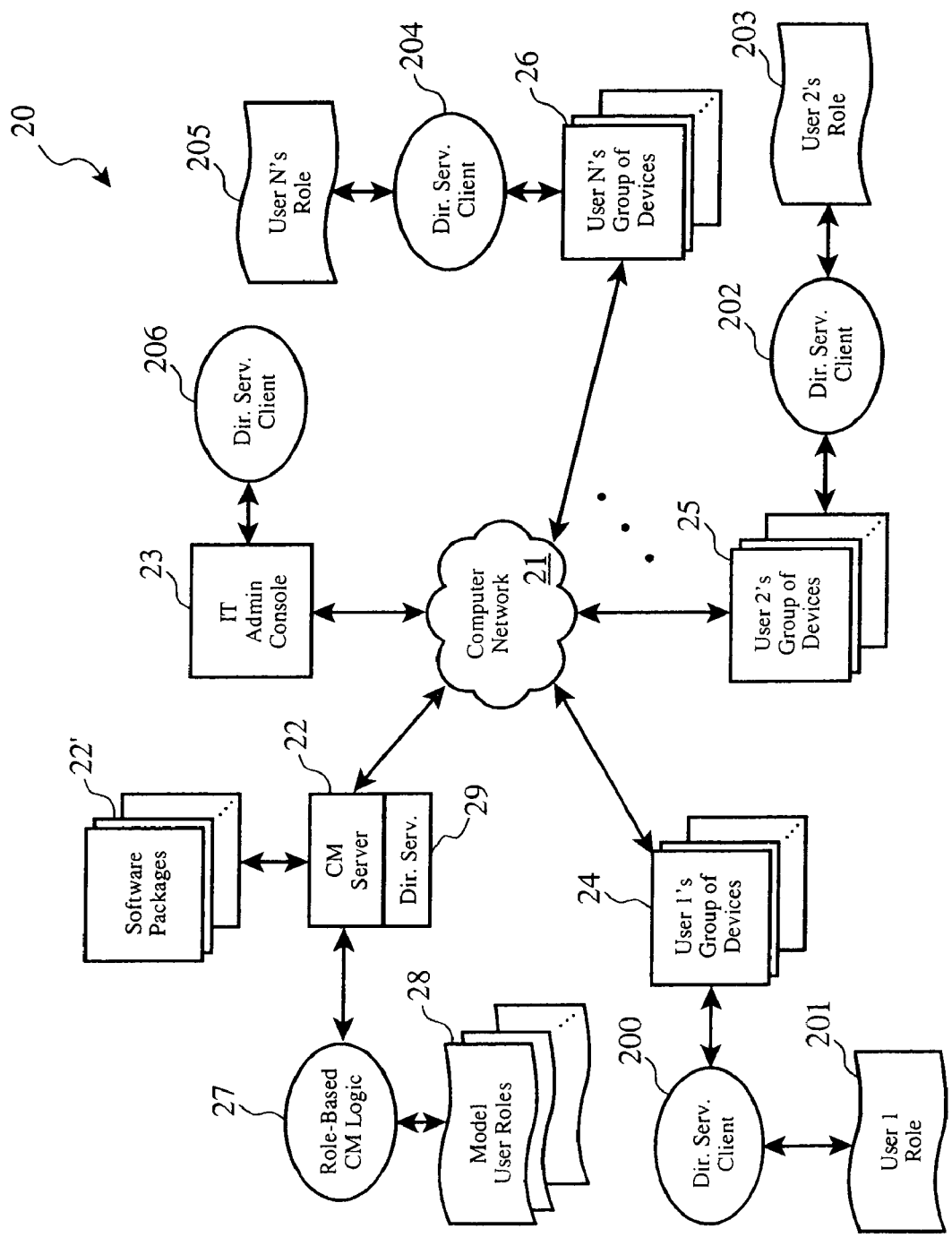
FIG. 2 depicts the organization and functions of the various networked systems according to the present invention.

FIG. 2 illustrates our role-based software provisioning architecture from a high level perspective (20). Computer network (21) or set of networks is used to interface a group of computing systems, including a configuration management server (22), which is preferably an IBM Tivoli Configuration Management system with a License Management option. The CM Server (22) is equipped with one or more configurable and deployable software packages (22') which can be downloaded to any system under management and installed for use by a user of such a system. As will be described in more detail in the following paragraphs, these software packages may include original installations, updates, enhancements, or de-installation files for application programs such as, but not limited to, word processors (e.g. MS Word, Lotus WordPro), spreadsheets (e.g. MS Excel, Lotus 1-2-3), web browsers (e.g. MS Internet Explorer, Netscape Navigator), software development tools (e.g. IBM Visual Age), work flow automation clients, messaging clients (e.g. Lotus Notes, Netscape Communicator, MS Outlook), contact management packages, games, utilities, and the like. These packages may include fully independent executable modules, or plug-ins and extensions such as dynamic link libraries ("DLL").

The CM Server (22) is also equipped with a Directory Service (29) protocol, as described in detail in the following paragraphs, which allows it to locate any user's computer, files or directories which are connected to the computer network (21), to modify those files and directories, and to receive notifications (e.g. "events") when certain files and directories on those systems are changed by other computing processes.

Additionally, the CM Server (22) is enhanced to include our new role-based CM auto-provisioning logical processes (27), preferably including one or more standard user roles (28) which can be used to assist in defining a new user's role model, as described in further detail in the following paragraphs.

According to this architecture, each user of a plurality of users (User 1, User 2, ... User N) is supplied with one or more computing systems such as a laptop computer, a desktop computer, and/or a pervasive computing device (e.g. PDA, WAP-enabled wireless telephone, PocketPC, etc.) (24, 25, 26). Virtual users may also be defined to "own" a community resource such as a server or gateway system.

Each of these user's computing devices is enhanced to include a directory service client (200, 202, 204) product matching the directory service protocol (29) of the enhanced CM Server (22) so as to allow the CM Server to find each of the devices (24, 25, 26), receive notifications from the devices, and make changes to those devices' files and directories. It is important to note that with selection of the appropriate directory service or directory protocol, a wide variety of computing devices (24, 25, 26) can be incorporated and maintained by this architecture, including, but not limited to, systems running Microsoft Windows ™ operating system variants (e.g. 95/98/2000/NT/XP/CE, etc.), PalmOS™, IBM's OS/2, Sun Microsystem's Solaris, UNIX, Linux, or even server-class operating system such as IBM's OS/390 or AIX. Further, a mixture of these types of devices may be configured and managed by a single CM Server system, as well.

Each of the user devices (24, 25, 26) are also enhanced to include a user role (201, 203, 205) which defines the user's needs for software applications, as described in more detail in the following paragraphs.

In a general sense of operation, each computing device within the enterprise is assigned a single user or owner, where each user may own one or more computing devices. For simplification of implementation, we restrict each device to having just one assigned user, but with additional logic, it is possible to extend the present invention to allow multiple user's for a single computing device.

Each new user is assigned one or more "roles" which determine his or her computing needs, typically based upon his or her job description or position within the company or organization. This determines an initial set of software programs and utilities (e.g. a initial software package) to be installed on each of his or her computing devices by the CM Server.

When a user's role changes, the CM Server receives notification of the change via the directory service, reevaluates his or her software needs based upon his or her current role definition(s), and updates the software, provisions new software, or de-provisions (e.g. recovers unused licenses) as necessary. As the preferred embodiment includes or incorporates a highly capable CM Server, all of this provisioning and configuration management can be performed remotely and on a scheduled basis.

Directory Services and Protocols

A directory service or directory protocol allows a networked computer to find or locate any other suitably equipped computer, and to potentially copy or modify the files, folders and directories on that other computer, regardless of the hardware or operating system of the two computers, through a commonly adopted or implemented protocol. One computer can be a relatively sophisticated device such as a desktop PC or web server computer, while the other computer can be similarly sophisticated or less sophisticated such as a PDA or PocketPC.

There are several known Directory Service protocols available for use in the present invention, including the Internet Engineering Task Force's ("IETF") X.500 protocol, and it's widely-adopted subset known as Lightweight Directory Access Protocol ("LDAP"), which is defined in the IETF's Request for Comments ("RFC") number 1777. A version 3 of LDAP is defined by RFC 2251, which includes enhanced security features. X.500 and LDAP are well known in the art, as their standards (e.g. the RFC's) are readily available to the public any may be generally implemented without license or fee.

Additionally, there are a number of suitable alternate Directory Service protocols and products available in the market such as Microsoft Corporation's Active Directory, Novell's Network Directory Service ("NDS"), and Sun Microsystem's Java Naming and Directory Interface ("JNDI"). Many of these alternate Directory Services incorporate part or all of LDAP or X.500 (e.g. "comply with" the RFC's), but also include some proprietary or non-standard functions as well. Widespread adoption of such products as Active Directory, NDS, and JNDI has given rise to them being referred to as "open" or "standard" by those skilled in the art, but in reality, most of these products require a license to use.

As such, our preferred embodiment uses any suitable directory service protocol, and especially LDAP through incorporation of JNDI. In the present description, we therefore provide details with respect to an embodiment employing LDPA an JNDI, but it will be recognized by those skilled in the art that other directory services and directory protocols may be used as well.

LDAP directories have become ubiquitous in the enterprise IT environment, and as such, our invention leverages the functionality they provide. The LDAP directories are the primary user repository in many enterprises. These directories also contain resources information such as computers and printers. The directories are very efficient in storing and retrieving user and resources information and the relationship that exists between users and resources.

LDAP is a software-based protocol for enabling anyone or any networked system to locate organizations, individuals, and other resources such as computer files and devices in a network. These resources may be located on the "public" Internet, or on a corporate intranet. LDAP is a subset of X.500, a broader standard for directory services in a network. Many vendors of software have adopted LDAP or have made their products compliant with LDAP, including IBM, Cisco, Microsoft and Novell.

Figure 3:
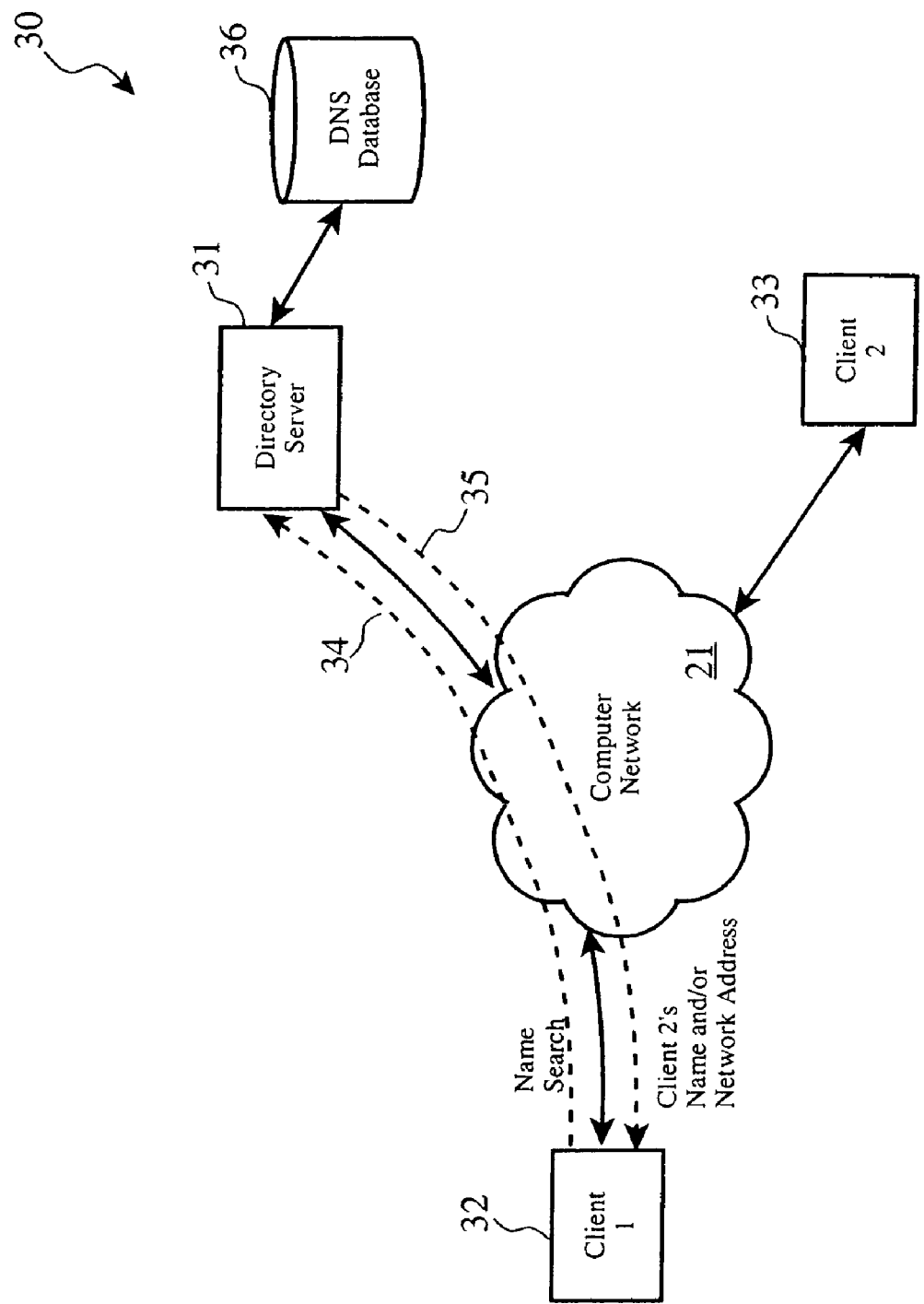
FIG. 3 illustrates a name search request and response process.

In a computer networked environment, a "directory" indicates where in the network something is located. The domain name system ("DNS") is the directory system used on TCP/IP networks such as the Internet, which relates domain names to a specific network addresses. If a domain name is unknown, a directory service such as LDAP allows a person or system to search on other criteria. For example, as shown in FIG. 3, a directory server (31) (a.k.a. an LDAP Directory System Agent or DSA) may receive a name search request (34) from a first client device (32), access a database (36) which correlates information to names and network addresses, and return (35) a network name (e.g. a URL), network address (e.g. IP address), or both to the first client (32) regarding the location and/or name of a second client (33) on the network. With respect to the present invention, this type of search and location function is useful to find the devices assigned to a user when configuring the software on those devices. The IETF RFC's fully explain the LDAP messaging protocol and search protocol.

JNDI ("Java Naming and Directory Interface") is one available programming paradigm which supports both LDAP client and server functions in the Java environment, and as such, is an aspect of our preferred embodiment. It will be recognized by those skilled in the art that other programming paradigms support LDAP functions as well, and can be alternately used to realize the present invention.

JNDI, which is part of the Java Enterprise application programming interface ("API") set, enables Java platform-based applications to access multiple naming and directory services, some of which are LDAP functions. JNDI allows developers to create portable applications that are enabled for a number of different naming and directory services, including: file systems; directory services such as LDAP, Novell Directory Services, and Network Information System ("NIS"); as well as distributed object systems such as the Common Object Request Broker Architecture ("CORBA"), Java Remote Method Invocation ("JRMI"), and Enterprise JavaBeans ("EJB").

Figure 4:
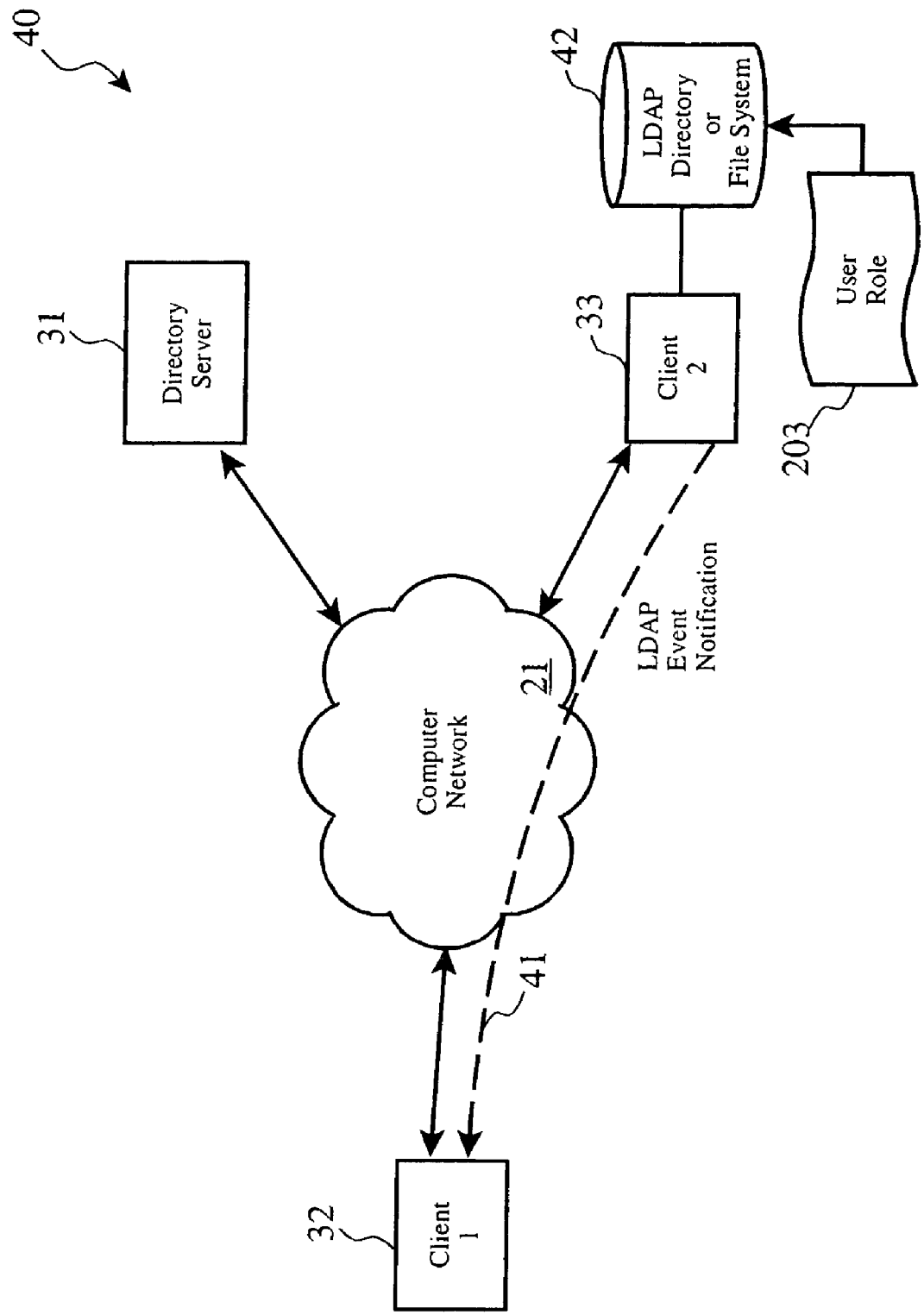
FIG. 4 illustrates an LDAP event notification process.

JNDI allows an LDAP client to register as a "listener" to events posted by LDAP event sources. When a watched file or resource on the LDAP event source changes (e.g. is modified, deleted or added), the event source device sends an event notification to all registered "listeners". For example, as shown in FIG. 4, a first client device (32) may register as an event listener for changes to the LDAP directory resources (42) (e.g. files and folders) on a second client (33). When one of these resources (42) is changed, the second client (33) sends an event notification (41) to the registered listener, the first client device (32). The first client device can then act appropriately in response to the event.

For our purposes, the present invention employs event notification to know when a user's role has been changed. As shown in FIG. 4, the user's role (203) including his or her identification (e.g. name, employee number, member number, etc.) are stored within the LDAP directory or file system (42). During initial system configuration, this role is downloaded from the CM Server into the local LDAP directory of the client device. Later, when the user's role changes (e.g. job function is modified), an event is posted to the CM Server (shown as client 1 in this figure), which triggers our role-based CM logical processes. These logical processes and role definitions are defined in more detail in the following paragraphs.

Configuration Management Systems

Figure 5:
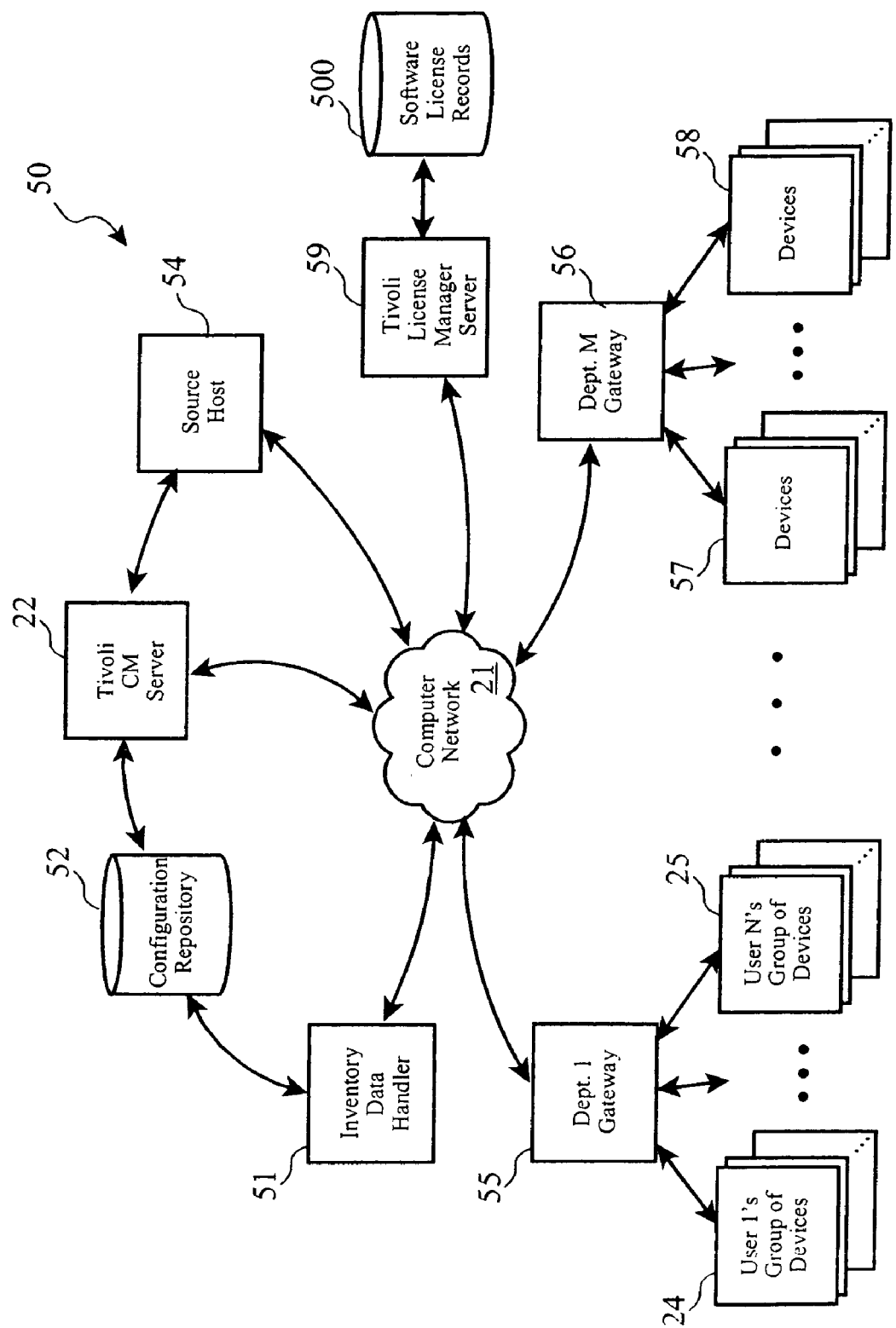
FIG. 5 depicts the arrangement of systems for configuration management using the IBM Tivoli CM product as a platform.

In general, the various CM systems available on the market operate on similar concepts and functional arrangements. Shown in FIG. 5 are some details of the Tivoli CM architecture, but it will be readily apparent to those skilled in the art that the present invention may be realized in conjunction with other CM tools and systems, as well as with role-based security and access systems and/or identity management systems. The present description includes details of our preferred embodiment using the Tivoli CM, but it will be recognized by those skilled in the art that these other configurations may also be implemented without departing from the scope of the present invention.

Turning to FIG. 5, an arrangement (50) of several networked devices is shown. The Tivoli CM Server (22) operates as a centralized organizer of software installation, updating, and inventorying logic, drawing its various configuration definitions from a configuration repository (52) and its application program files for installation and download from a source host (54). An inventory data handler (51) is also preferably provided which provides periodic inventory scans of installed bases of software on the managed devices. A repeater server (not shown) may be deployed to hold software packages for later distribution from the CM sever (53) to realize multicasting on a scheduled basis, as previously described.

According to our preferred arrangement, each organizational department is optionally provided with a departmental gateway (55, 56) through which a plurality of user devices (24, 25, 57, 58) are accessible using the directory service protocol (e.g. LDAP in our preferred embodiment). In this arrangement (50), the normal functions of the CM Server such as new device configuration, installation of application programs, updating of application programs, and de-installation of application programs can be accomplished in the usual manner.

As shown in FIG. 2 and previously described, the CM Server (22) is modified to include or have remote call access to our new role-based CM logic, which preferably includes one or more model or standard user role definitions for assistance in provisioning new systems for new users.

User Role Definitions

Also as previously discussed and shown in FIG. 2, each user's device is configured to include a user role definition (201, 203, 205) in the directory served by the LDAP client. This user role definition is preferably in the form of a file, but may alternately be stored in other manners so long as it can be initially created, written or downloaded from the remote CM server, and it can be monitored such that changes to it result in an event notification being sent to the CM server and the role-based CM logical processes (27).

For example, Table 1 shows an example of a model role definition (28) for a technical support specialist, while Table 2 shows an example of a model role definition (28) for a sales person, whose software needs have been previously described.

TABLE 1

Model Technical Support Role Definition

```
<CM_role_definition>
    <CM_role_name> Tech_support </CM_role_name>
    <user_name> TBD </user_name>
    <device>
        <device_description> IBM ThinkPad </device_description>
        <OS> Linux Ver. 9.0 </OS>
        <networking> TCPIP_pkg_15 </networking>
        <application_programs>
            Lotus WordPro;
            Lotus 1-2-3;
```

TABLE 1-continued

Model Technical Support Role Definition

```
        IBM Visual Age;
        IBM_inside_trouble_tkt_client;
      </application_programs>
    </device>
    <device>
      <device_description> Palm Tungsten </device_description>
      <OS> native </OS>
      <networking> native </networking>
      <application_programs>
        Lotus WordPro_reader_for_PalmOS;
        IBM_inside_trouble_tkt_reader_for_PalmOS;
      </application_programs>
    </device>
</CM_role_definition>
```

As can be seen from Table 1, an undesignated (e.g. new) technical support person would normally be configured with certain programs for his or her laptop computer (e.g. an IBM ThinkPad) and his or her Palm PDA.

TABLE 2

Model Saleperson Role Definition

```
<CM_role_definition>
    <CM_role_name> Sales </CM_role_name>
    <user_name> TBD </user_name>
    <device>
      <device_description> IBM ThinkPad </device_description>
      <OS> Linux Ver. 9.0 </OS>
      <networking> TCPIP_pkg_15 </networking>
      <application_programs>
        Lotus WordPro;
        Lotus 1-2-3;
        Goldmine Ver. 12;
      </application_programs>
    </device>
    <device>
      <device_description> Palm Tungsten </device_description>
      <OS> native </OS>
      <networking> native </networking>
      <application_programs>
        Lotus WordPro_reader_for_PalmOS;
        Lotus 1-2-3_reader_for_PalmOS;
        Goldmine_reader_for_PalmOS;
      </application_programs>
    </device>
</CM_role_definition>
```

Table 2 shows a different configuration of software to be loaded onto new devices (e.g. a laptop and a PDA) for new sales persons. These examples are shown in a markup language format such as eXtensible Markup Language ("XML"), but could equally well be implemented in binary, text, or other formats.

To effect assignment of a user role to a specific device during initial configuration, the role-based CM logic must assign a user name or other identifier (e.g. user number, employee number, etc.) to the model role definition, allow the IT administrator to modify the model role definition through the administration console, and then to download the role definition into the appropriate machine(s) as needed. For example, in our preferred embodiment, only the portion of the role definitions which applies to a particular device is downloaded into that device's LDAP directory, such as only downloading the laptop definitions to a laptop computer, and only downloading the PDA definitions to a PDA device. Alternatively, though, the entire user role definition may be stored in each device assigned to a user which would allow polling of any of the user's device to obtain a full description of all of the user's devices.

Also, during initial configuration of each device, the appropriately designated software packages as listed in the role definitions, are prepared and remotely installed by the CM Server onto the user's devices in the conventional manner.

After initial configuration, an IT administrator may retrieve a user's role definitions from one or more of the user's devices using the directory services, modify the role, and re-download it to the device(s). Or, the user may modify his or her own role definitions, which would trigger an event notification and appropriate software changes, as described in the following paragraphs.

Role-Based CM Logical Processes

Figure 6:
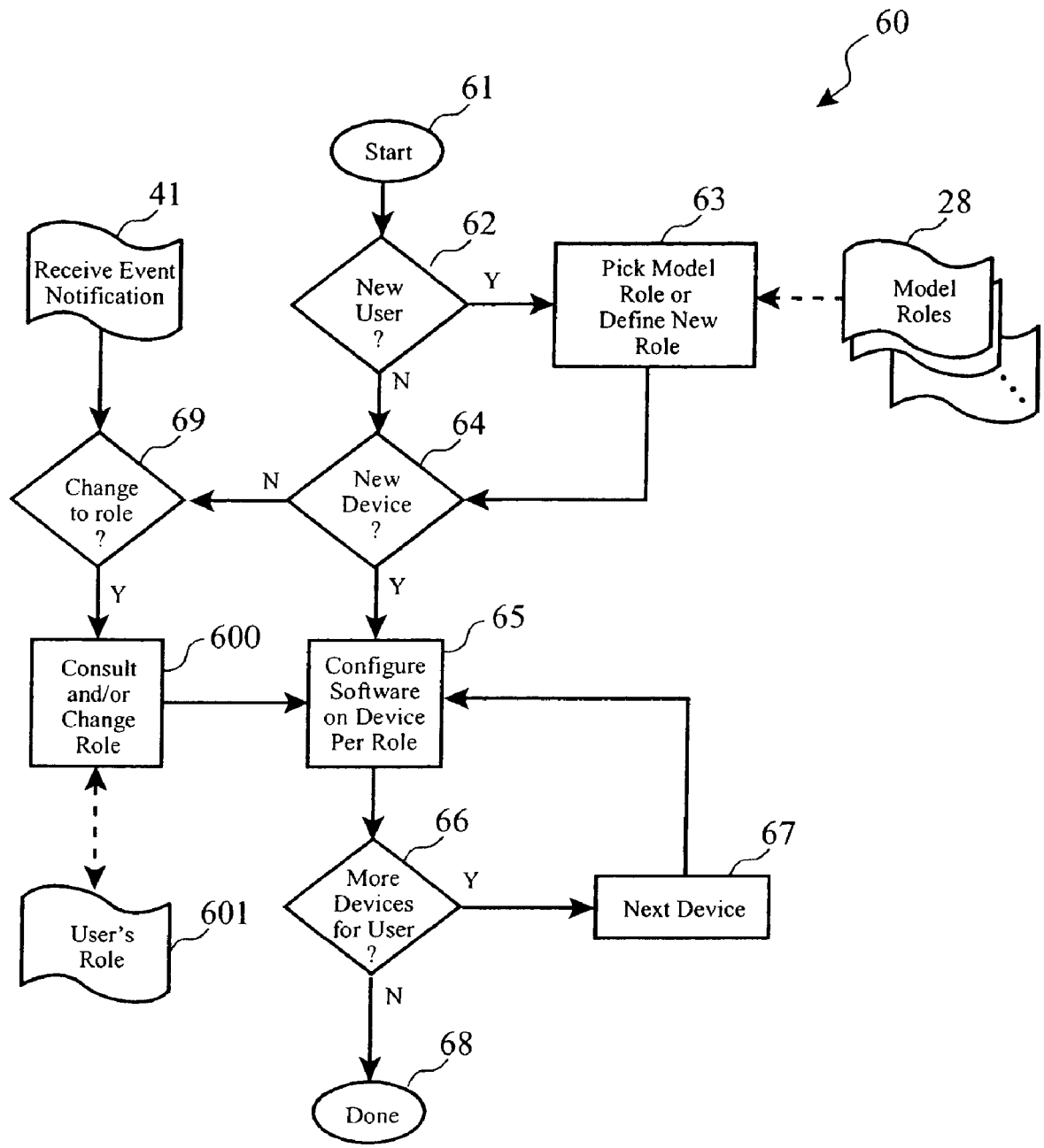
FIG. 6 provides a logical process illustration according to the present invention.

Turning to FIG. 6, the logical processes according to our invention are shown in a generalized manner. These logical processes may be implemented as one program in a suitable programming language, or in a set of coordinated and cooperating programs in a suitable programming language, as necessary. For example, they may be implemented as Java servlets or as one C program, according to the implementer's preferences. In our preferred embodiment, these processes have been realized in a set of C and/or Java programs which remotely connect to the Configuration Manager server.

In one manner of starting (61) the role-based CM logic (60) such as by invocation by an IT administrator, if (62) a new user is being defined, the administrator is allowed to pick a "standard" or predefined role definition (28), such as the salespersons' or technical support specialists' role as previously described. The administrator may modify the role definitions as needed, or create an entirely new role definition, using as suitable editor such as an XML editor. This role definition is then stored for later download to the user's device(s) along with the indicated software packages during initial installation.

If (64) the user already has a defined role but a new device is being added for the user (e.g. the user has a new PDA but previously had a desktop PC configured), the logical process allows the new device to be configured (65) with the software packages as indicated by the role definitions for that user, including downloading of the role definition into the user's device(s), until all the devices (67) have been properly configured.

If (69) the role of the user is to be changed, then the IT administrator is provided an opportunity to consult the existing role definitions and modify them for that user (600), followed by reconfiguring (65) the software applications on each device which is affected by the role change (e.g. uninstalling a package, upgrading a package, or installing a package), until all the devices (67) have been properly configured.

Upon receipt of a change event notification via the directory service protocol (41) as a result of a user's change to his or her own role definitions (or as the result of a remote administrator changing the role definitions), the change to the role is automatically analyzed (600) with optional administrator review, followed by automatic reconfiguration (66) of the affected devices until all the devices (67) have been properly configured.

In keeping with the periodic inventory functions of the conventional CM Server systems, these logical processes may also be automatically initiate periodically as well, allowing all of the user's devices to be periodically automatically reconfigured to have only the software packages needed according to their current roles.

Additionally, in keeping with the license management and recovery functions of the conventional CM Server systems, the logical processes of the present invention will assist in automatically recovering unused software licenses due to user role changes which otherwise would go wastefully allocated until the next manual inventory of that user's software configurations.

Integration to Role-Based Security Systems or Identity Management Systems

As previously mentioned, the present invention may alternatively be implemented in conjunction with available role-based security and access systems such as the system described in the related patent application, allowing role definitions of such a system to be utilized in the automatic configuration of user's devices. It is within the skill of those in the art to adapt the presently described embodiment to this alternate embodiment when provided with the description contained herein.

Integration of License Manager Server

According to another aspect of a preferred embodiment, a license management server such as the Tivoli License Manager ("TLM") (59) shown in FIG. 5 is incorporated into the overall system arrangement, and the logical processes of the invention are adapted to interface to the license manager server as described in the following paragraphs.

Tivoli License Manager is a well-known system, often employed in conjunction with the Tivoli Configuration Manager system, which provides a comprehensive software asset management function for organizations large and small. TLM tracks the number of owned or leased software licenses, where they are deployed, and how many are unused. When a new computer is configured with one or more software packages, TLM can take the licenses out of available inventory and record them (500) as being installed on the new computer. If a software package on a computer is uninstalled, TLM can "recover" that license, putting it back into available inventory. Using TLM, an enterprise can more efficiently manage their investment in software licenses, avoid over spending on unnecessary licenses, and comply with copyright and end user license agreement ("EULA") provisions. It will be recognized by those skilled in the art, however, that alternate license manager systems and platforms may be used in place of the Tivoli product without departing from the scope of the present invention.

Figure 7:
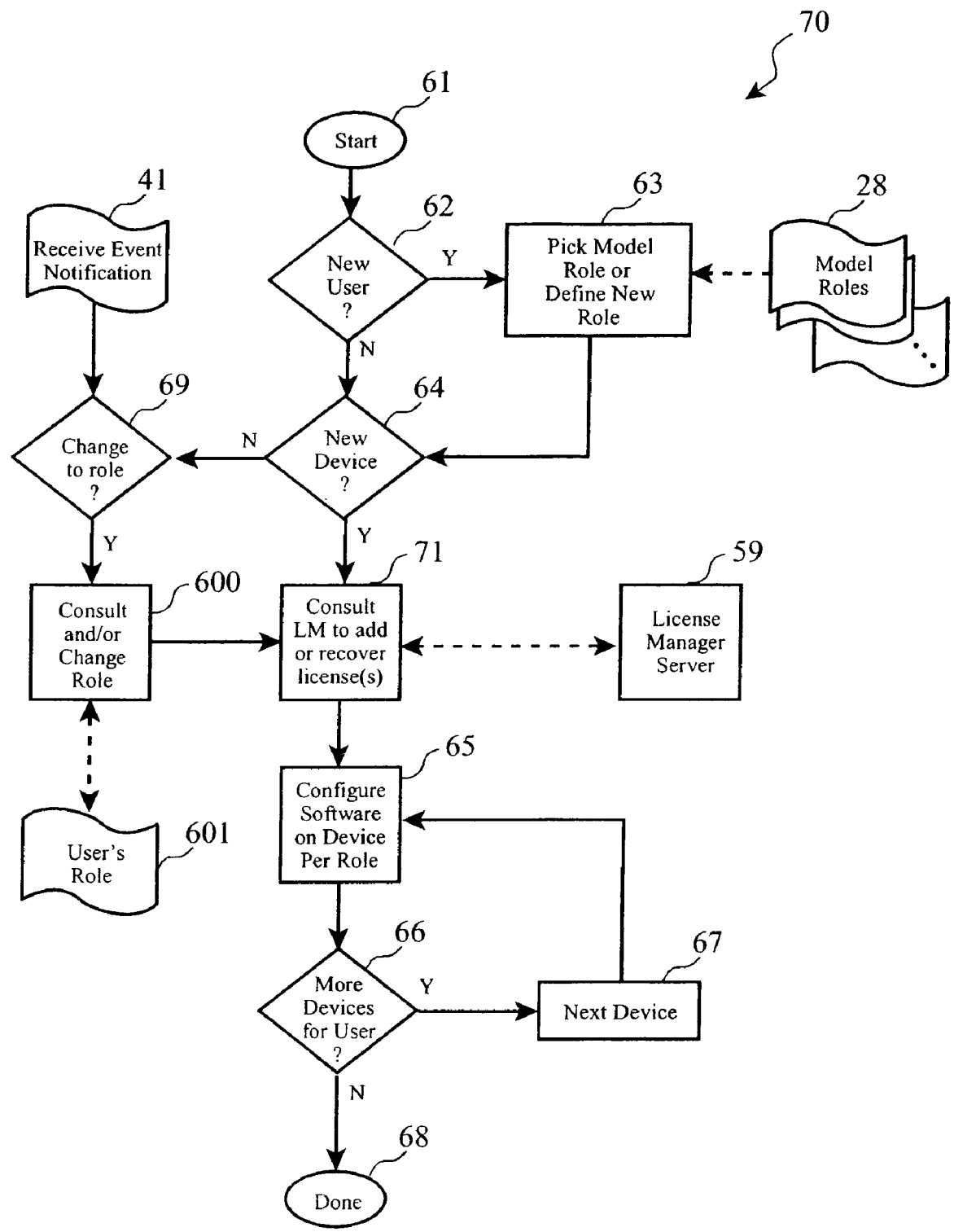
FIG. 7 provides an enhanced logical process illustration according to the present invention wherein a license manager server is consulted to allow installation of new software or recover licenses for uninstalled software.

Turning to FIG. 7, an enhanced logical process (70) according to the present invention is shown which utilizes such a license manager for license management and recovery. Whenever a role is changed or created, an LDAP event is generated and handled as previously described (61, 62, 63, 64, 69, 600), however instead of proceeding directly to configuring one or more software packages onto the affected computer, a license manager server (59) is consulted (71) to determine if it is permissible to add the software package(s) to the computer. If the role change results in the removal or uninstallation of one or more software packages, the consultation (71) also notifies the license manager server (59) to return the license to available inventory (e.g. recover the license(s)).

Conclusion

The present invention may be realized in a variety of forms, programming languages, methodologies, and operating systems on a variety of computing platforms without departure from the spirit and scope of the present invention. A number of example embodiment details have been disclosed as well as optional aspects of the present invention in order to illustrate the invention, but which do not define the scope of the invention. Therefore, the scope of the present invention should be determined by the following claims.

What is claimed is:

1. A method for automatically provisioning a networked device with one or more software programs comprising the:

associating with a first user and a first networked client device at least one computer-readable user-organizational role definition file, containing at least one software package identifier according to an organizational role to be performed by said user;

initializing said first networked client device for use in said organization by said user for said user-organizational role by installing one or more software packages on said networked client device according to said software package identifiers in said user-organizational role definition file;

storing said user-organizational role definition file on or in said associated first networked client device using a Lightweight Directory Access Protocol directory service protocol such that said user-organizational role definition file is modifiable by said first user using said networked device, and such that a Lightweight Directory Access Protocol server may monitor status of said user-organizational role definition file;

subsequent to said initialization of said first networked client device, providing on-demand reconfiguration responsive to detection of modification by said first user of said user-organizational role definition file through monitoring by said Lightweight Directory Access Protocol server by:

reevaluating software package requirements of said first networked client device with respect to said first user's modified role definition;

installing on said first networked client device via said Lightweight Directory Access Protocol one or more software packages required by said first user according to a modified first user's organizational role as reflected in said modified user-organizational role definition file; and uninstalling from said first networked client device via said Lightweight Directory Access Protocol one or more software packages no longer required by said first user according to a modified organizational role as reflected in said first user's modified user-organizational role definition file; and recovering one or more licenses by a license management system corresponding to said uninstalled software packages such that recovered licenses may be reassigned to second and subsequent users of second and subsequent networked client devices during repetition of said steps of initialization and providing on-demand reconfiguration.

* * * * *